(12) United States Patent
Casas Barrado et al.

(10) Patent No.: US 12,513,518 B2
(45) Date of Patent: Dec. 30, 2025

(54) SYSTEMS AND METHODS FOR MANAGING INCOMING CALLS IN THE METAVERSE

(71) Applicant: Telefónica Innovación Digital, Madrid (ES)

(72) Inventors: Manuel Casas Barrado, Madrid (ES); Berta Sanchez Hueso, Madrid (ES); Guillaume Paris, Madrid (ES); Francisco Jose Rodriguez Perez, Madrid (ES); Pau Masia Martinez, Madrid (ES); David Moro, Madrid (ES); Josue Igual, Madrid (ES)

(73) Assignee: Telefónica Innovación Digital, Madrid (ES)

( * ) Notice: Subject to any disclaimer, the term of this patent is extended or adjusted under 35 U.S.C. 154(b) by 187 days.

(21) Appl. No.: 18/374,056

(22) Filed: Sep. 28, 2023

(65) Prior Publication Data
US 2024/0107305 A1   Mar. 28, 2024

(30) Foreign Application Priority Data

Sep. 28, 2022 (EP) .................................... 22382892

(51) Int. Cl.
*H04W 12/06* (2021.01)
*G06F 3/01* (2006.01)
(Continued)

(52) U.S. Cl.
CPC ............. *H04W 12/06* (2013.01); *G06F 3/011* (2013.01); *G06F 3/017* (2013.01); *H04L 65/104* (2013.01); *H04L 65/1069* (2013.01); *H04L 65/1073* (2013.01); *H04L 65/1089* (2013.01); *H04L 65/1093* (2013.01); *H04N 13/111* (2018.05);
(Continued)

(58) Field of Classification Search
None
See application file for complete search history.

(56) References Cited

U.S. PATENT DOCUMENTS 11,564,266 B1 * 1/2023 Kahn ...................... H04W 4/24
2015/0280963 A1 * 10/2015 Bollapalli ............. H04L 41/052
709/227
(Continued)

OTHER PUBLICATIONS

European Search Report Dated Feb. 22, 2023 From the European Patent Office Re. Application No. 22382892.2. (3 Pages).

*Primary Examiner* — Raqiul A Choudhury

(57) ABSTRACT

A system (100) for managing incoming calls in a user's mobile device (3) while using a user's virtual reality, VR, device (1), comprising a user's mobile device (3) comprising a SIM card associated to a Mobile Subscriber Integrated Services Digital Number, MSISDN, the SIM card associated to a mobile carrier from an IP Multimedia. Subsystem, IMS, network (6), a user's virtual reality, VR, device (1) comprising computing means (2) to perform a pairing process between the mobile device (3) and the user's VR device (1) and managing incoming calls, an authentication module (4) configured to authenticate the user's mobile device (3), wherein authenticate means that the VR user (A) is in possession of the user's mobile device (3) comprising the SIM card; and a Web Real Time Communications Gateway, WebRTC GW (5) connected to the IMS network (6) of the mobile carrier and configured to translate IMS signaling into WebRTC signaling.

15 Claims, 8 Drawing Sheets

(51) Int. Cl.
*H04L 65/1016* (2022.01)
*H04L 65/1033* (2022.01)
*H04L 65/1069* (2022.01)
*H04L 65/1073* (2022.01)
*H04L 65/1089* (2022.01)
*H04L 65/1093* (2022.01)
*H04L 65/1108* (2022.01)
*H04N 13/111* (2018.01)
*H04N 13/398* (2018.01)
*H04W 12/33* (2021.01)
*H04W 12/72* (2021.01)
*H04W 76/10* (2018.01)

(52) U.S. Cl.
CPC .......... *H04N 13/398* (2018.05); *H04W 12/33* (2021.01); *H04W 12/72* (2021.01); *H04W 76/10* (2018.02); *H04L 65/1016* (2013.01); *H04L 65/1108* (2022.05)

(56) References Cited

U.S. PATENT DOCUMENTS

| | | | |
|---|---|---|---|
| 2016/0119788 A1* | 4/2016 | Mandyam | H04L 65/1016 455/411 |
| 2018/0279128 A1* | 9/2018 | Zaifuddin | H04L 65/1069 |
| 2019/0306203 A1* | 10/2019 | Jokela | H04L 65/1108 |
| 2020/0296578 A1* | 9/2020 | Synal | H04W 8/18 |
| 2021/0049821 A1 | 2/2021 | Chebolu et al. | |
| 2022/0021723 A1 | 1/2022 | Oyman et al. | |

* cited by examiner

SYSTEMS AND METHODS FOR MANAGING INCOMING CALLS IN THE METAVERSE

Present invention generally relates to systems and methods for managing incoming calls in a user's mobile device while using a user's virtual reality, VR, device.

BACKGROUND OF THE INVENTION

A virtual reality (VR) headset is a head-mounted device that provides a virtual reality experience for the end-user. They are used to provide immersive experiences via a stereoscopic head-mounted display. When the user puts on a VR headset, a proper experience requires the absence of real-world visual stimulus, so he/she needs to set-up it properly (e.g., via some adjustment strips) in operations that take some time.

Every time the user needs to move back and forth from the VR device to the real world (e.g., to read a password, attend a call, etc.) the VR experience suffers a lot, as the operation of taking-off/putting-on a VR device takes some time.

These devices are SIM-less devices, i.e., no cellular communication capability can be offered due to the lack of SIM card.

Hence, when a user is enjoying a VR experience and certain events from the physical world happen, the user needs to interrupt the ongoing VR experience in case the user wants to check what is going on. When that event is an incoming call, the process is:
  User takes off the VR headset
  User checks the external event, in the case of the incoming call check the caller
  User replies (if needed the call)
  User makes the call
  When the call is finished, the user puts the VR device on again
  Drawbacks of the VR experience:
  This experience is not ideal as:
  Taking on/off a VR device is not an easy task: it requires some adjustments to ensure an appropriate experience.
  In many situations, the external events can just be ignored (e.g., spam or non-urgent calls), so knowing that the external event can be safely ignored would be just enough to improve the experience (e.g., peace of mind).
  In case the call must be answered, the user needs to do it in a separate device, interrupt the VR experience and go back to that experience when the call is finished.

The present invention solves at least the aforementioned drawbacks.

DESCRIPTION OF THE INVENTION

The present application describes a method that permits users of VR (Virtual Reality) devices to take full control of an external event that consist of an incoming call that can be an audio call or a video call while immersed in a VR experience.

According to the proposed method, when receiving an incoming call, the user can:
  Check who is calling (i.e., the caller) without taking off the VR device;
  Reject the call without taking off the VR device;
  Accept the call and establish it directly via the VR device;
  Finish ongoing calls directly on the VR device;
  In case the incoming call is a video call, the user can decide which video stream is shared with the caller.

To enable all these features the user can configure the mobile subscription to be used in the VR device via a paring process. Users can pair/unpair a mobile subscription to the VR device dynamically.

In a first aspect, the present invention solves at least the aforementioned problems by providing a system for managing incoming calls in a user's mobile device while using a user's VR, device. The system comprises
  a user's mobile device comprising a SIM card associated to a Mobile Subscriber Integrated Services Digital Number, MSISDN, the SIM card associated to a mobile carrier provided with an IP Multimedia Subsystem, IMS, network,
  a user's virtual reality, VR, device comprising computing means to perform a pairing process between the mobile device and the user's VR device and managing incoming calls, an authentication module configured to authenticate the user's mobile device, wherein authenticate means that the VR user is in possession of the user's mobile device comprising the SIM card; and
  a Web Real Time Communications Gateway, WebRTC GW, connected to the IMS network of the mobile carrier and configured to translate IMS signaling into WebRTC signaling, It should be understood that the term SIM card is not restricted to a physical SIM card but may also refer to a virtual SIM card, e.g., eSIM or iSIM.

In a first stage, the system according to the first aspect of the present invention is configured to perform pairing between the user's mobile device and the user's VR device by performing the following steps:
  The computing means in the user's VR device is configured to request the VR user to enter the MSISDN associated to the SIM card of the user's mobile device.
  The computing means in the user's VR device is configured to request the authentication module to authenticate the VR user by challenging the VR user to probe the possession of the SIM card associated to the MSISDN.
  Upon successful authentication of the user, the computing means is configured to retrieve user's authentication credentials from the authenticator module and register the user's authentication credentials in the WebRTC GW.
  Upon registering the user's authentication credentials in the WebRTC GW, the WebRTC GW is configured to verify said credentials in the authentication module and register the user's VR device with the IMS network to complete pairing.

In a second stage, upon completing pairing between the user's mobile device and the user's VR device, the system according to the first aspect of the present invention is configured to manage the flow of an incoming call from a caller aimed at the MSISDN associated to the SIM card in the user's mobile device by performing the following steps:
  The WebRTC GW is configured to receive an incoming call request associated with the incoming call I from the caller and notifying the user's VR device via the computing means.
  Furthermore, the user's VR device is configured to inform the VR user about the incoming call and accept or reject the incoming call based on a user's action by establishing or rejecting a connection between the user's VR device and the caller via the WebRTC GW. Next, the WebRTC GW is configured, upon establishing the connection, to notify the VR user or the caller that the connection is finished upon rejecting the connection by any of the parties.

In one example, challenging the VR user to probe the possession of the SIM card to authenticate the user's mobile device comprises the reception of a PIN number via SMS aimed at the MSISDN associated to the SIM card in the user's mobile device.

In a first example, the incoming call is a video call and the user's VR device providing a VR stereoscopic projection to the user, and the computing means in the user's VR device is configured to prompt the VR user to select a first output video stream to be transmitted to the caller via the WebRTC GW, wherein the first output video stream is derived from the VR stereoscopic projection, that is, the projection the VR user is watching in the VR device. It should be noted that the output video will be a regular video derived from the VR stereoscopic projection as long as the established call is a regular video call but it could be a stereoscopic video in case the caller device and the call support this type of signal.

The computing means in the user's VR device is configured to project an incoming video stream in replacement of the whole VR stereoscopic projection or project an incoming video stream in combination with the VR stereoscopic projection. As an exemplary realization, this can be done by embedding the video stream in a frame shown in the VR stereoscopic projection, which may be part of a virtual object shown in such projection.

In a second example, the incoming call is a video call, the system comprises a recording device and the computing means in the user's VR device is configured to prompt the VR user to select a second video stream to be transmitted to the caller via the WebRTC GW, wherein the second video stream is provided from the recording device, e.g., an external camera configured to record the user.

In some examples, the user's VR device comprises a user's microphone to register the speech of the user.

In some examples, the user's VR device comprises a hand-tracking sensor to tracks the gestures performed by the VR user with his hands. This can be used by the VR device to generate the animation of the avatar to replicate the gestures performed by the user.

In a third example, the incoming call is a video call and the computing means in the user's VR device is configured to generate a user's avatar based gestures performed by the VR user with his hands obtained by the hand-tracking sensor and video obtained from the external camera and/or audio obtained from the user's microphone, and prompt the VR user to transmit the generated user's avatar as third output video stream to the caller via the WebRTC GW. In some examples, the avatar may be an animated avatar or a static avatar.

A second aspect of the invention refers to a method for managing incoming calls in a user's mobile device while using a user's VR device, the method performed by the system according to the first aspect of the invention.

In a first stage, the method comprises performing pairing between the user's mobile device and the user's VR device by carrying out the steps of requesting the VR user to enter the MSISDN associated to the SIM card of the user's mobile device by the computing means in the user's VR device, and verifying the MSISDN by challenging the VR user to probe the possession of the SIM card to authenticate the user's mobile device by the computing means in the user's VR device.

Upon successful authentication of the user, the method comprises retrieving user's authentication credentials by the computing means in the user's VR device and registering the user's authentication credentials by the computing means in the WebRTC GW.

Upon registering the user's authentication credentials, the method comprises verifying said credentials by the WebRTC GW and registering the user's VR device with the IMS network by the WebRTC GW to complete pairing.

In a second stage, upon completing pairing between the user's mobile device and the user's VR device, the method comprises managing the flow of an incoming call from a caller received at the MSISDN of the user's mobile device by receiving an incoming call request associated with the incoming call from the caller via the WebRTC GW, notifying with the WebRTC GW the user's VR device, informing the VR user about the incoming call with the user's VR device and accepting or rejecting with the user's VR device the incoming call based on a user's action by establishing or rejecting a connection between the user's VR device and the caller.

Finally, upon establishing the connection, the WebRTC GW notifying the VR user or the caller that the connection is finished upon rejecting the connection by any of the parties.

In a first example, the incoming call is a video call with an incoming video stream and the user's VR device is configured to provide a VR stereoscopic projection to the user. In this example, the method comprises prompting the VR user to select a first output video stream to be transmitted to the caller via the WebRTC GW by the computing means in the user's VR device, wherein the first output video stream is part of a VR stereoscopic projection.

In an alternative example, the method further comprises prompting the VR user to select a second output video stream to be transmitted to the caller via the WebRTC GW by the computing means in the user's VR device, wherein the second output video stream is provided from a recording device In another alternative example, the method comprises generating by the computing means in the user's VR device a user's avatar based on gestures performed by the VR user with his hands obtained from a hand-tracking sensor, video obtained from the recording device and/or audio obtained from a user's microphone and prompting the VR user to transmit the user's avatar as third output video stream to the caller via the WebRTC GW by the computing means in the user's VR device.

In a preferred example, the method comprises projecting the incoming video stream in replacement of the VR stereoscopic projection by the computing means in the user's VR device or projecting the incoming video stream in combination with the VR stereoscopic projection by the computing means in the user's VR device.

Advantageously, the present invention permits users to keep connected with external world while using a VR headset or device. It gives users full control, so the users know that in case something urgent is happening in the real word they will not miss it. In particular, the following advantages can be summarized:

It allows end-users to decide which mobile subscription is linked to a VR device.

It allows end-users to receive notifications about incoming calls with enough information to take decisions about it.

It allows end-users to reject incoming calls without leaving the VR experience.

It allows end-users to hold calls during the VR experiences.

It allows end-users to configure different output video streams to be provided to the other party in the video call, allowing the end-user to share the experience he/she is having at the VR device, or to share an animated avatar of him/herself.

It allows end-users to decide how to integrate incoming video streams in the VR Experience.

It allows end-users to define how the different devices that could handle incoming calls should be prioritized.

BRIEF DESCRIPTION OF THE DRAWINGS

To complete the description that is being made and with the object of assisting in a better understanding of the characteristics of the invention, in accordance with a preferred example of practical embodiment thereof, accompanying said description as an integral part thereof, is a set of drawings wherein, by way of illustration and not restrictively, the following has been represented.

DESCRIPTION OF A PREFERRED EXAMPLE

Figure 1:
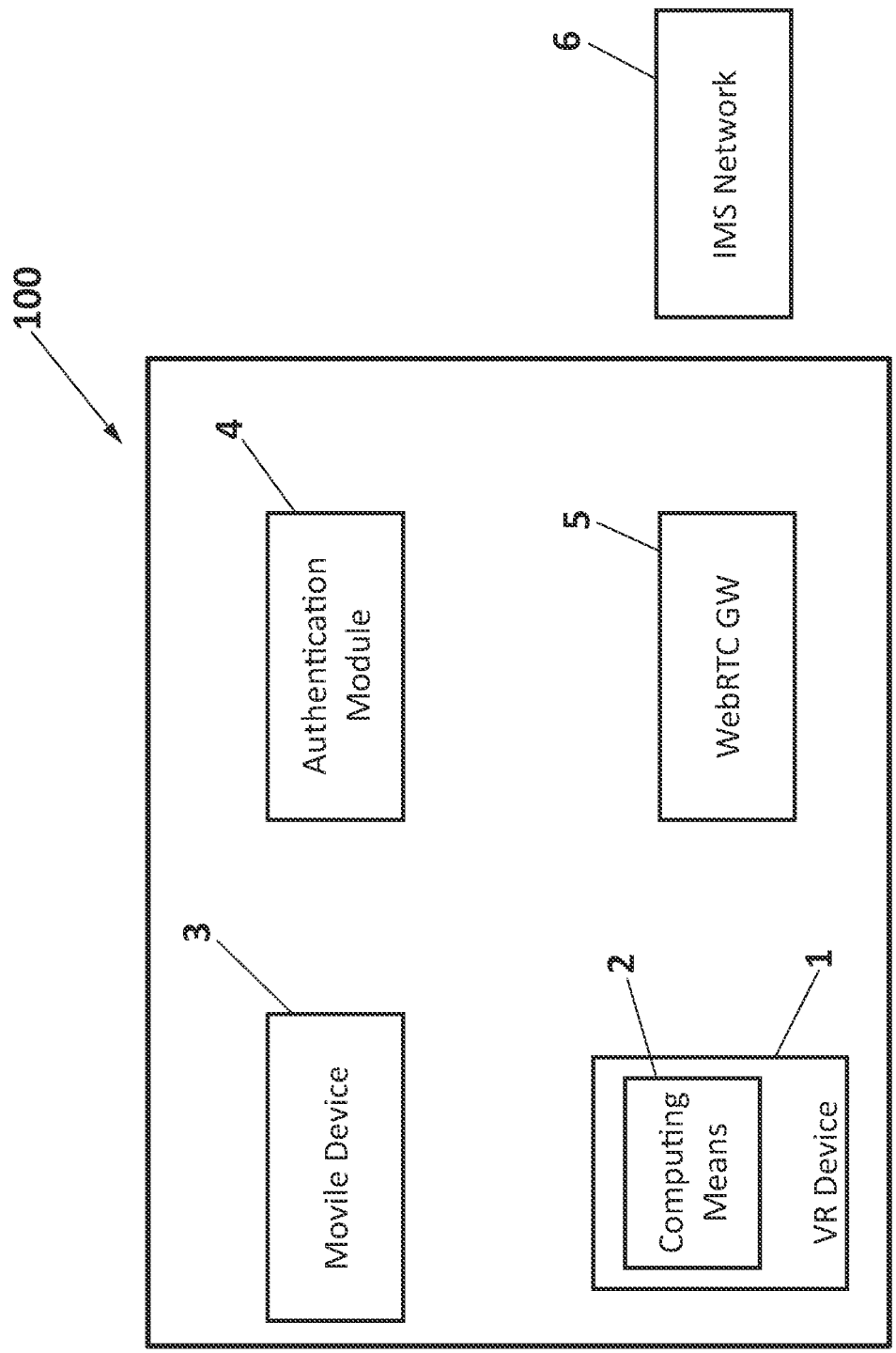
FIG. 1 shows the main elements of the system for managing incoming calls in a user's mobile device while using a user's VR device.

FIG. 1 shows the main elements of the system (100) for managing incoming calls in a user's mobile device while using a user's VR device.

The system (100) for managing incoming calls comprises a user's mobile device (3) comprising a SIM card associated to a Mobile Subscriber Integrated Services Digital Number, MSISDN. The SIM card is associated to a mobile carrier provided with an IP Multimedia Subsystem, IMS, network (6). The mobile device (3) is equipped with the SIM card of the mobile subscription.

The system (100) for managing incoming calls comprises a user's VR device (1). The user's VR device (1) can offer VR users an immersive experience. The user's VR device (1) comprises computing means (2) e.g., a piece of software "VR Comms Software" that is responsible of two processes: to perform a pairing process between the mobile device (3) and the VR device (1), and the management of incoming calls.

The system (100) for managing incoming calls further comprises an authentication module (4) configured to authenticate the user's mobile device (3), wherein authenticate means that the VR user (A) is in possession of the user's mobile device (3) comprising the SIM card. Hence, authentication of the mobile device (3) can be supported with the authentication module (4) that guarantees that the VR user (A) is in possession of the mobile device (3) and verifies the user's authentication credentials used during the process.

The system (100) for managing incoming calls also comprises a WebRTC GW (5) connected to the IMS network (6) of the mobile carrier and configured to translate IMS signaling into WebRTC signaling. The WebRTC GW (5) is configured to translate IMS (IP Multimedia System) signaling into WebRTC signaling that can be handled by the VR device (1). The WebRTC GW (5) can be connected to the "IMS network" (6) of the carrier the SIM card subscription is associated to.

Pairing Process

Figure 2:
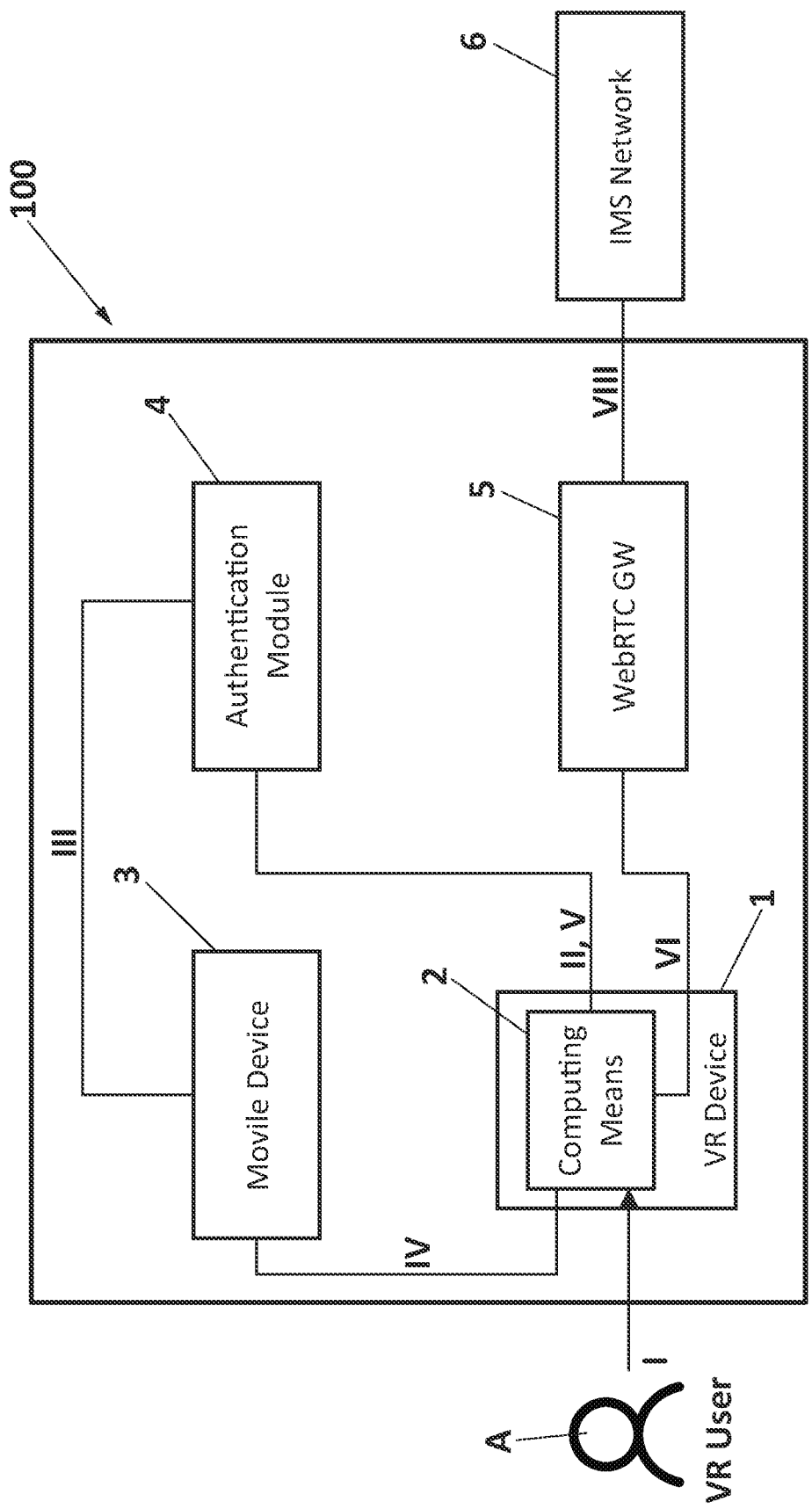
FIG. 2 shows the pairing process between the user's mobile device and the user's VR device.

FIG. 2 shows the pairing process when a VR user (A) wants to link the user's VR device (1) to the mobile device (3).

When a VR user (A) wants to link the user's VR device (1) to a mobile subscription in a mobile device (3) the following steps can be performed as shown in FIG. 2:

Step (I): In the user's VR device (1) the computing means (2) requires the VR user (A) to enter the MSISDN (Mobile Subscriber Integrated Services Digital Number) of the mobile subscription to be used.

Step (II): The computing means (2) requests the authentication module (4) to challenge the MSISDN to authenticate the VR User (A) to probe the possession of the SIM card by to be used.

Step (III): The authentication module (4) challenges the user to verify the possession of the SIM card. An exemplary way to achieve this is via a PIN number sent via SMS to the MSISDN indicated in Step (I), but as a skilled person would appreciate, other methods can be used for this purpose.

Step (IV): The VR user (A) probes to the computing means (2) in the user's VR device (1) that he/she is in possession of the SIM card. In the example depicted in the previous step, the user would enter the received PIN code.

Step (V): Upon successful verification of ownership, the computing means (2) will retrieve authentication credentials from the authentication module (4).

Step (VI): The credentials will be registered in the WebRTC GW (5).

Step (VII): The WebRTC GW (5) can verify those credentials in the authentication module (4).

Step (VIII): The WebRTC GW (5) can register the user's VR device (1) and will inform the IMS network (6) about said registration to complete pairing of the user's VR device (1) with the MSISDN of the SIM card in the mobile device (3).

Incoming Calls

Figure 3:
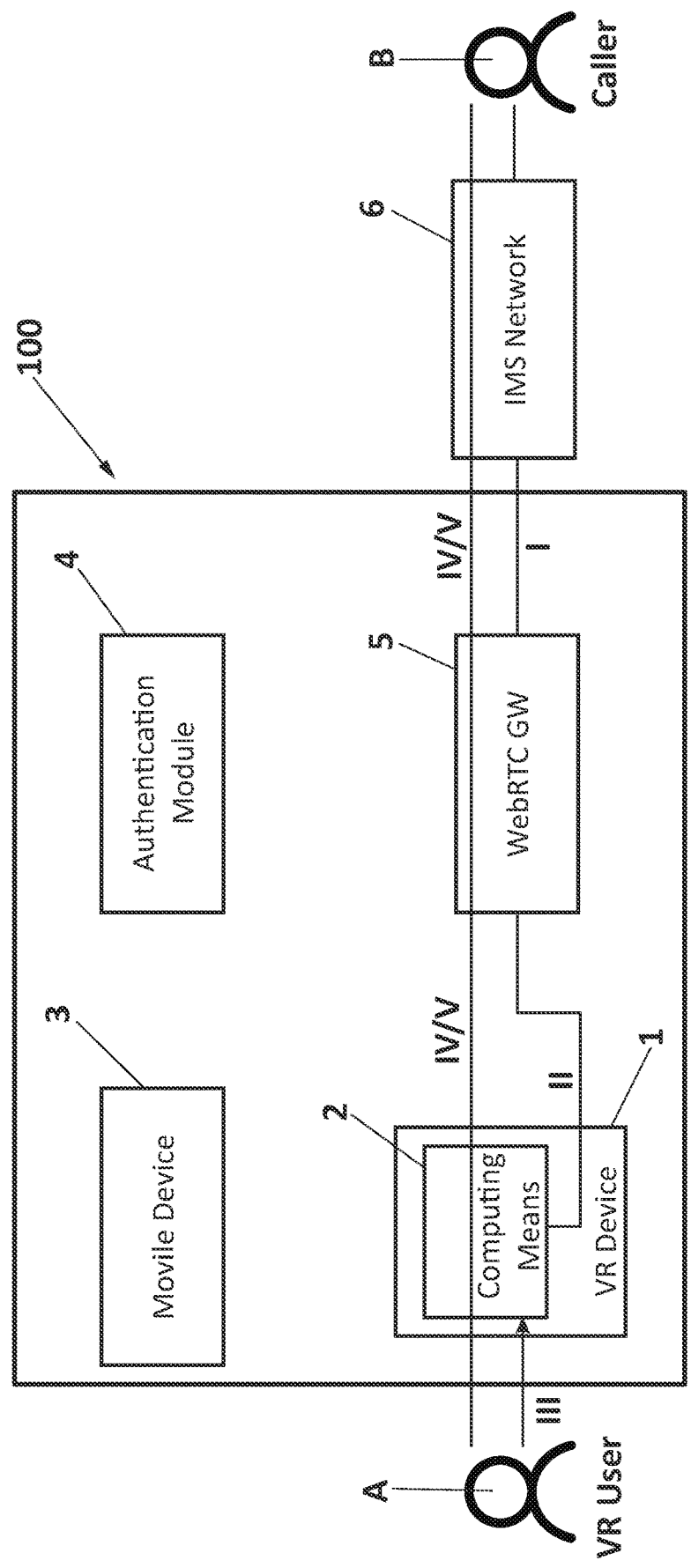
FIG. 3 shows the managing of an incoming call from a caller to the VR user.

FIG. 3 shows the managing of the flow for incoming calls by the system (100) after completing the pairing process:

Step (I): When an incoming call being a voice or video call is received at the MSISDN in the mobile device (3), the WebRTC GW (5) can be configured to receive the incoming call request.

Step (II): As the user's VR device (1) is paired to the mobile device (3), the WebRTC GW (5) can notify the user's VR device (1) via the computing means (2) in the VR device (1).

Step (III): The VR user (A) will receive an indication about the incoming call so the VR user (A) can decide whether to accept or reject the call, for instance depending on who is the caller (B). If the VR user (A) decides to decline the call, the call will not be established.

Step (IV): If the VR user (A) decides to accept the call, the connection will be established with the caller (B) via the WebRTC GW (5) that will be responsible for ensuring the connection is maintained. Hence, the VR user (A) can have the call and keep the VR experience in the user's VR device (1) running at the same time.

Step (V): When any of the parties on the call decides to finish the call, the other party will be notified via the WebRTC GW (5).

Alternative Implementations: Video Calls as Incoming Calls

One use-case that is different in the case of VR devices is when the incoming call is a video call. When a video call is established, the two parties involved i.e. (VR user (A) and the caller (B)) send one video stream to the other party. In most of the devices, that stream is the output registered by a camera that is recording the face/body of the party. However, when using a VR headset as e.g., the user's VR device (1) that camera is not available due to the form factor of those devices.

Figure 4:
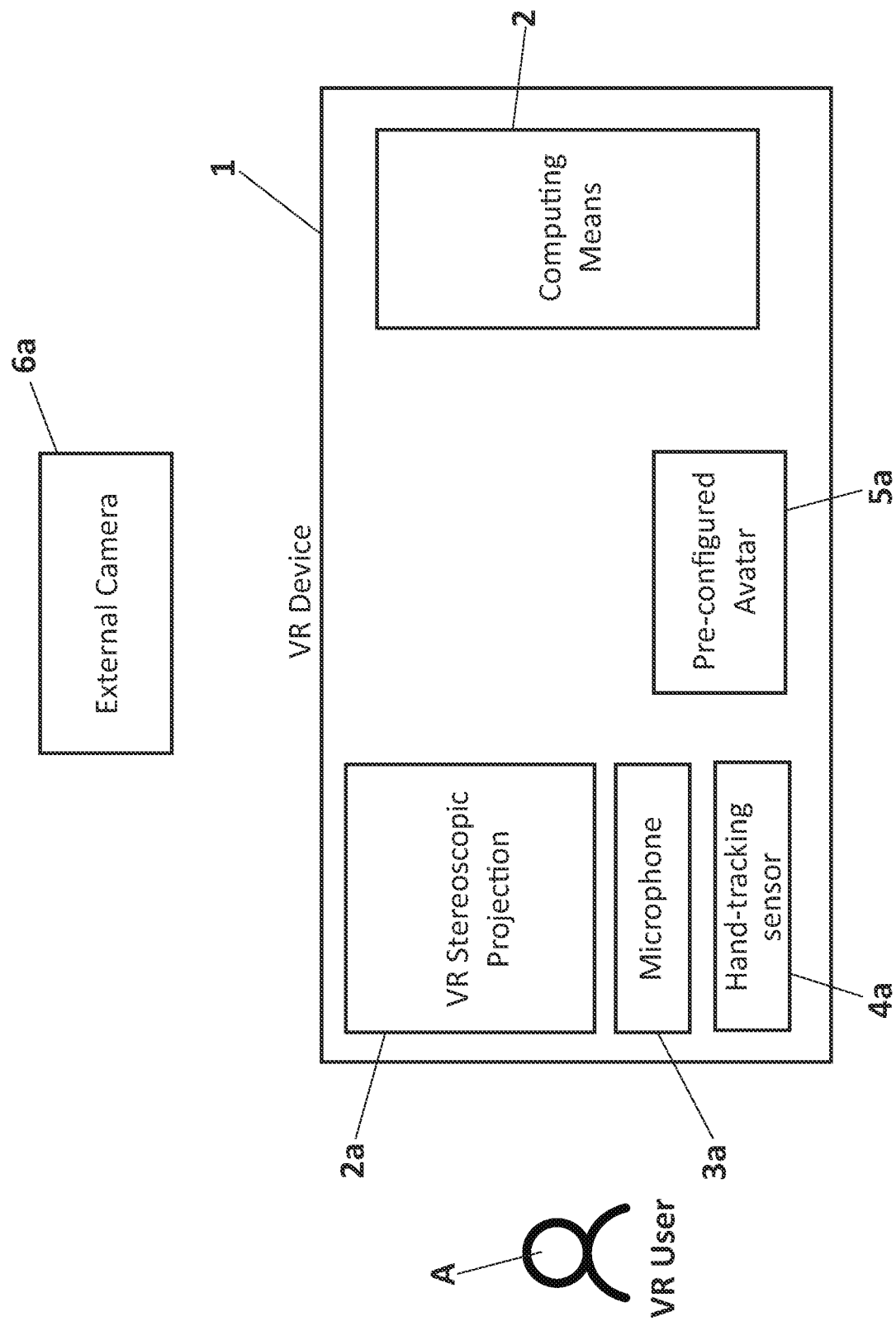
FIG. 4 shows elements of the system in combination with the use of an external camera.

FIG. 4 shows further elements comprised in the system (100) for managing video calls as incoming calls. In particular, the system (100) comprises as shown in previous figures the computing means (2) comprising a piece of software that is part of the user's VR device (1) and handles the communications.

Furthermore, the system (100) for managing video calls as incoming calls comprises a VR Stereoscopic projection (2*a*) which is a projection that the VR user (A) can see through the user's eyes in the VR Device (1).

Furthermore, the system (100) can comprise a microphone (3*a*) configured to register the speech of the VR user (A).

The system (100) can also comprise a hand-tracking sensor (4*a*) configured to track the gestures performed by the VR user (A) with his hands.

The system (100) can also comprise pre-configured avatars (5*a*), e.g., one or more avatars that represent the VR user (A). The pre-configured avatars (5*a*) can be stored in the VR Device (1), which may generate an animated version of the avatar based on other input signal such as the hand-tracking sensor (4*a*) or an external camera (6*a*).

The system (100) can also comprise an external camera (6*a*) as recording device and configured to record the user (A). The external camera (6*a*) is connected to the VR Device (1).

When performing a video-call, the computing means (2) can let the VR user (A) (during establishment or during the call) to select the video stream to be shared with the other party in the video-call. The following possibilities can be offered to the VR user (A):

Option 1: Share part of the VR device screen, i.e., part of what the VR user (A) is enjoying in the immersive experience (e.g., a gaming experience).

Option 2: Share a streaming input from a recording device (e.g., the external camera (6*a*), an assistant equipped with a camera, etc.).

Option 3: Share an avatar (e.g., the one used in the VR device (1)). The avatar can be static or dynamically animated, for instance, analyzing the VR user's voice, gestures or movement, as registered by sensors such as the hand-tracking sensor (4*a*) or an external camera (6*a*).

Option 1: Share Part of the VR Device Screen

Figure 5:
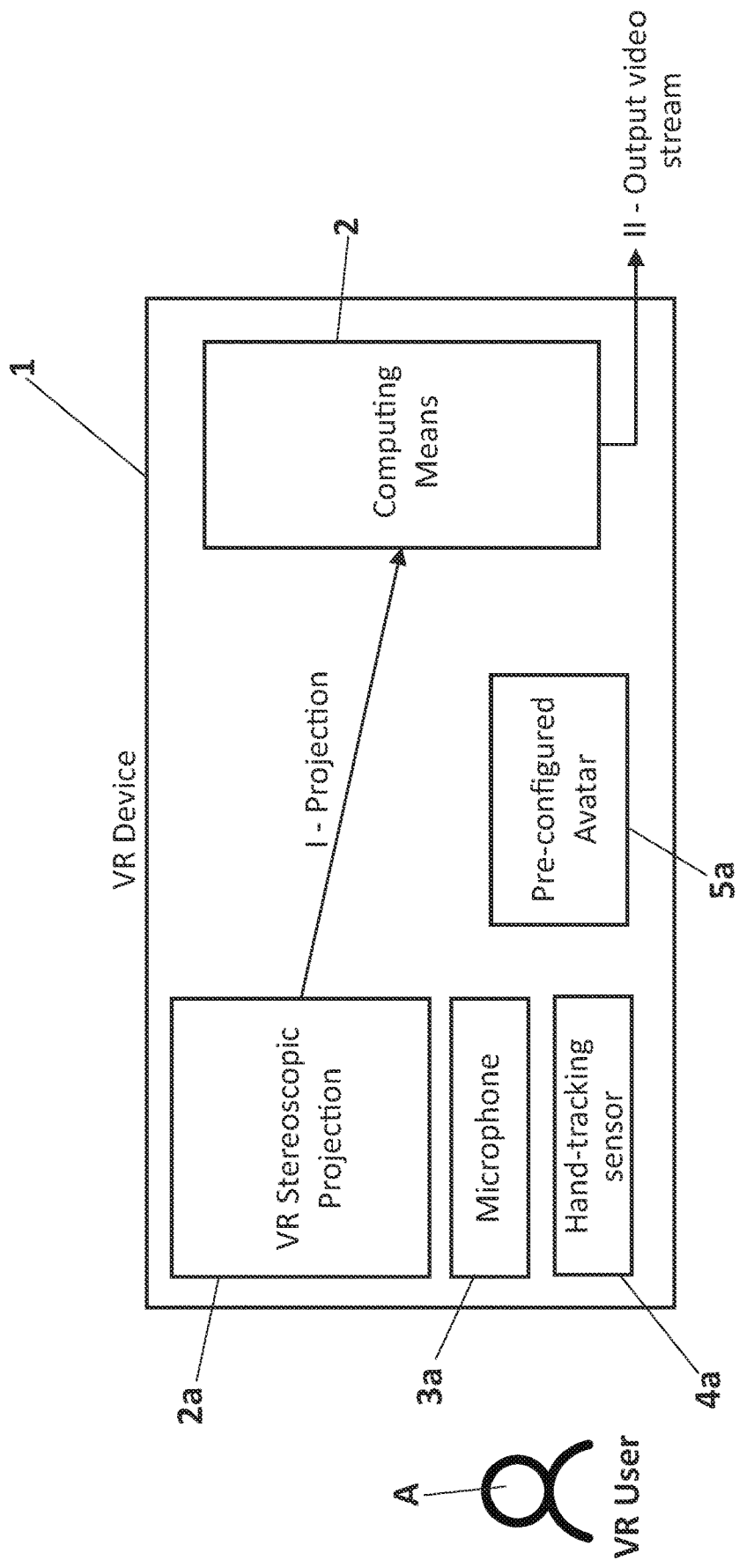
FIG. 5 shows the managing of an incoming call being a video call when the user shares the projection as the output video stream.

FIG. 5 presents the flow in case the VR user (A) decides to share the VR Stereoscopic projection (2*a*) as the output video stream:

Step (I): The VR stereoscopic projection (2*a*) is sent to the computing means (2) in the VR device (1).

Step (II): The computing means (2) in the user's VR device (1) creates a video stream based on that projection that is sent to the other peer.

Option 2: Share a Streaming Input From a Recording Device

Figure 6:
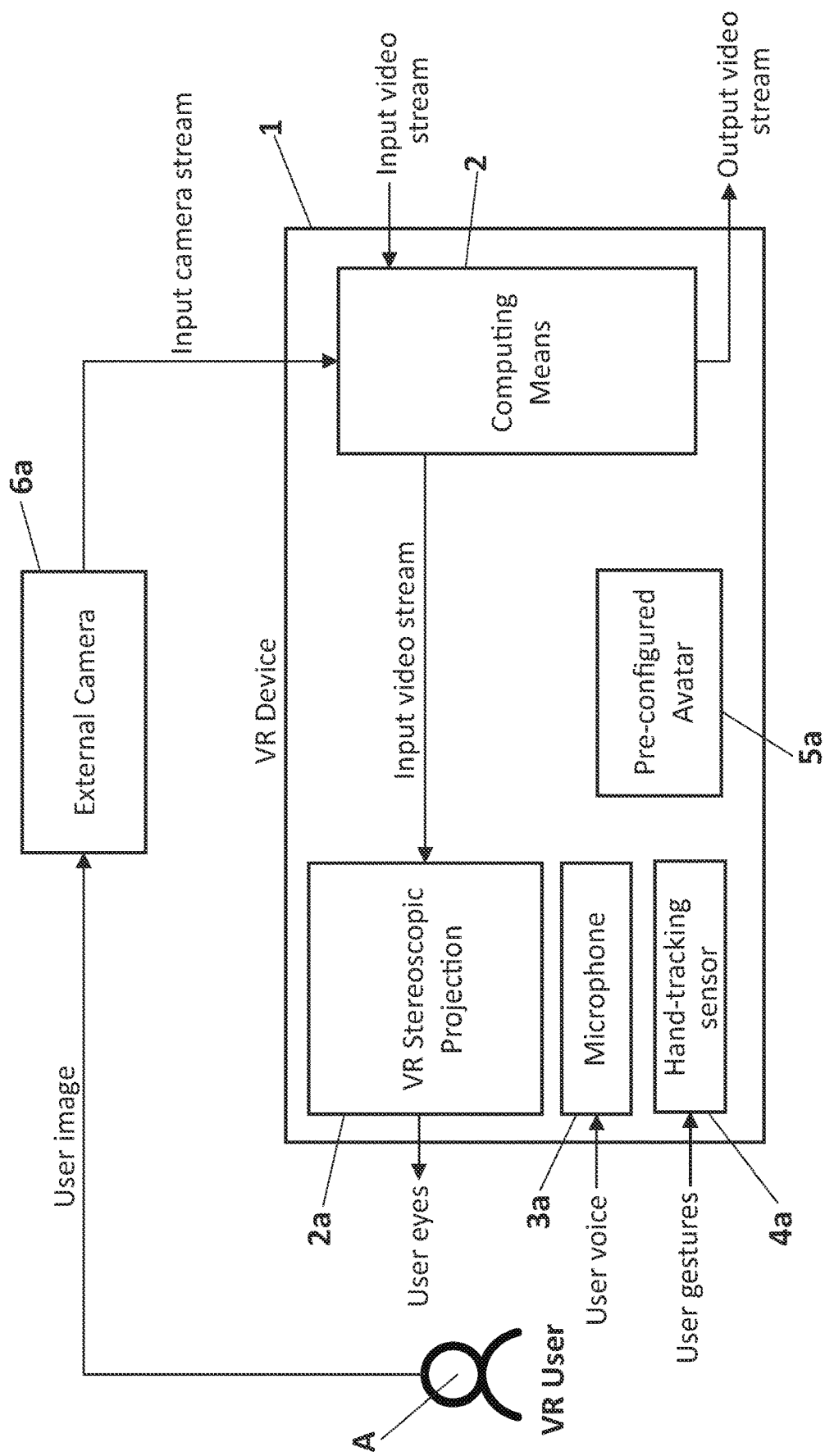
FIG. 6 shows the managing of an incoming call being a video call when the user uses an external camera as the output video stream.

FIG. 6 describes the flow or steps in case the VR user (A) decides to use an external camera (6*a*) as the recording device for the output video stream:

Step (I): The external camera (6*a*) captures the VR user (A).

Step (II): The video from the external camera (6*a*) is sent to the computing means (2) in the VR device (1).

Step (III): The computing means (2) in the user's VR device (1) sends that stream as the output video stream.

Option 3: Share an Avatar

Figure 7:
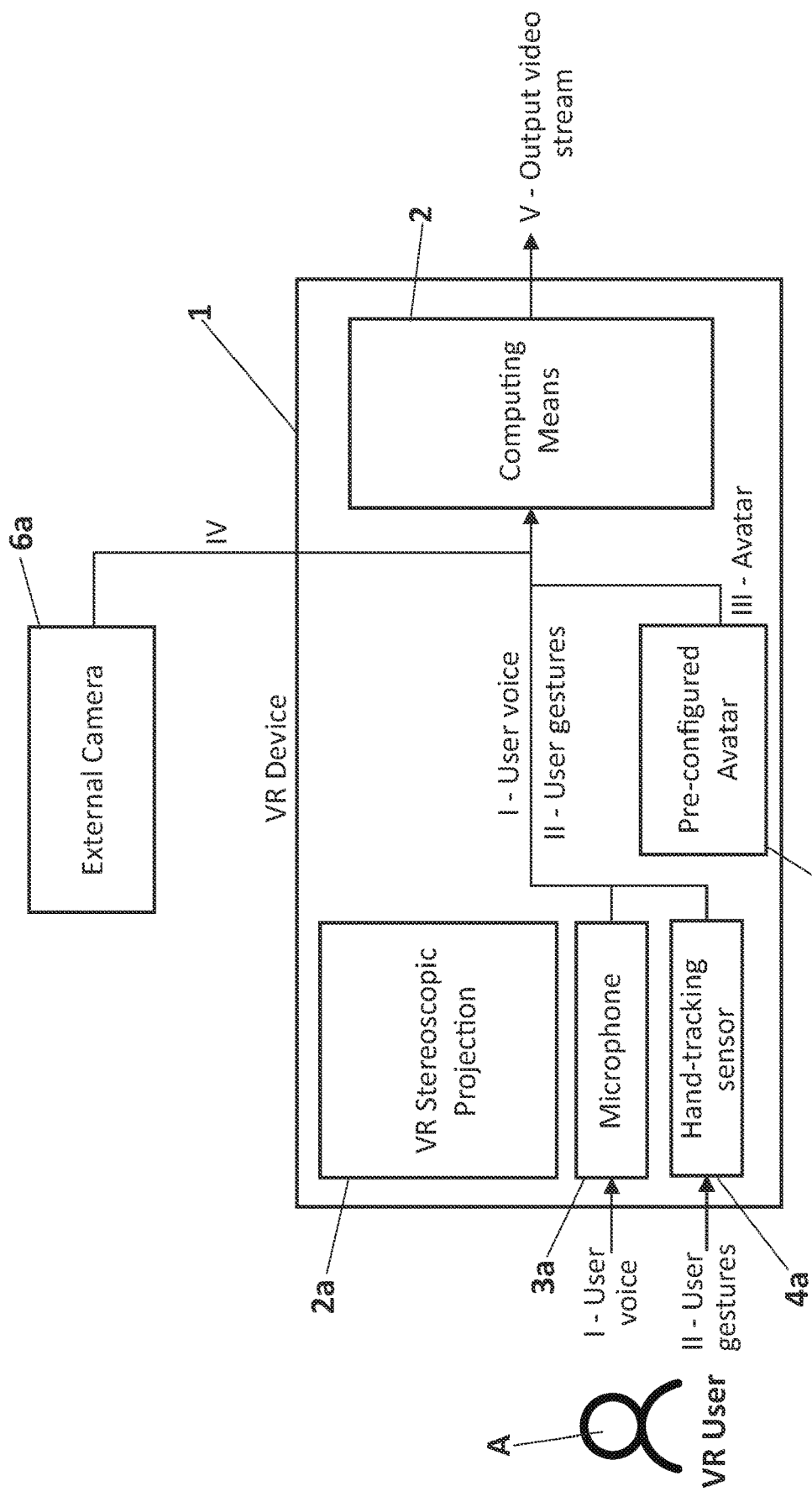
FIG. 7 shows the managing of an incoming call being a video call when the user uses an animated avatar as the output video stream.

FIG. 7 describes the flow in case the VR user (A) decides to use an animated avatar as the output video stream:

Step (I): The VR microphone (3*a*) captures user voice.

Step (II): The hand-tracking sensor (4*a*) captures the gestures of the VR user (A).

Step (III): The pre-configured avatar (5*a*) is sent to the computing means (2).

Step (IV): The video from the external camera (6*a*) is sent to the computing means (2) in the VR device (1).

Step (V): The computing means (2) creates an animated avatar based on the voice, gestures and/or video and sends that stream as the output video stream to the caller (B).

Regarding the incoming video stream in the VR device (1), it could be also configured in different ways:

Solution 1: The VR user (A) could decide to replace the whole VR Stereoscopic projection (2*a*) with the incoming video screen (e.g., in a full screen mode).

Solution 2: The user could decide to occupy just part of the VR Stereoscopic projection (2*a*) with the incoming video stream (e.g., the VR user (A) can decide the area and the position of the stream). In this case, the VR experience (2*a*) continues in parallel with the video stream.

Figure 8:
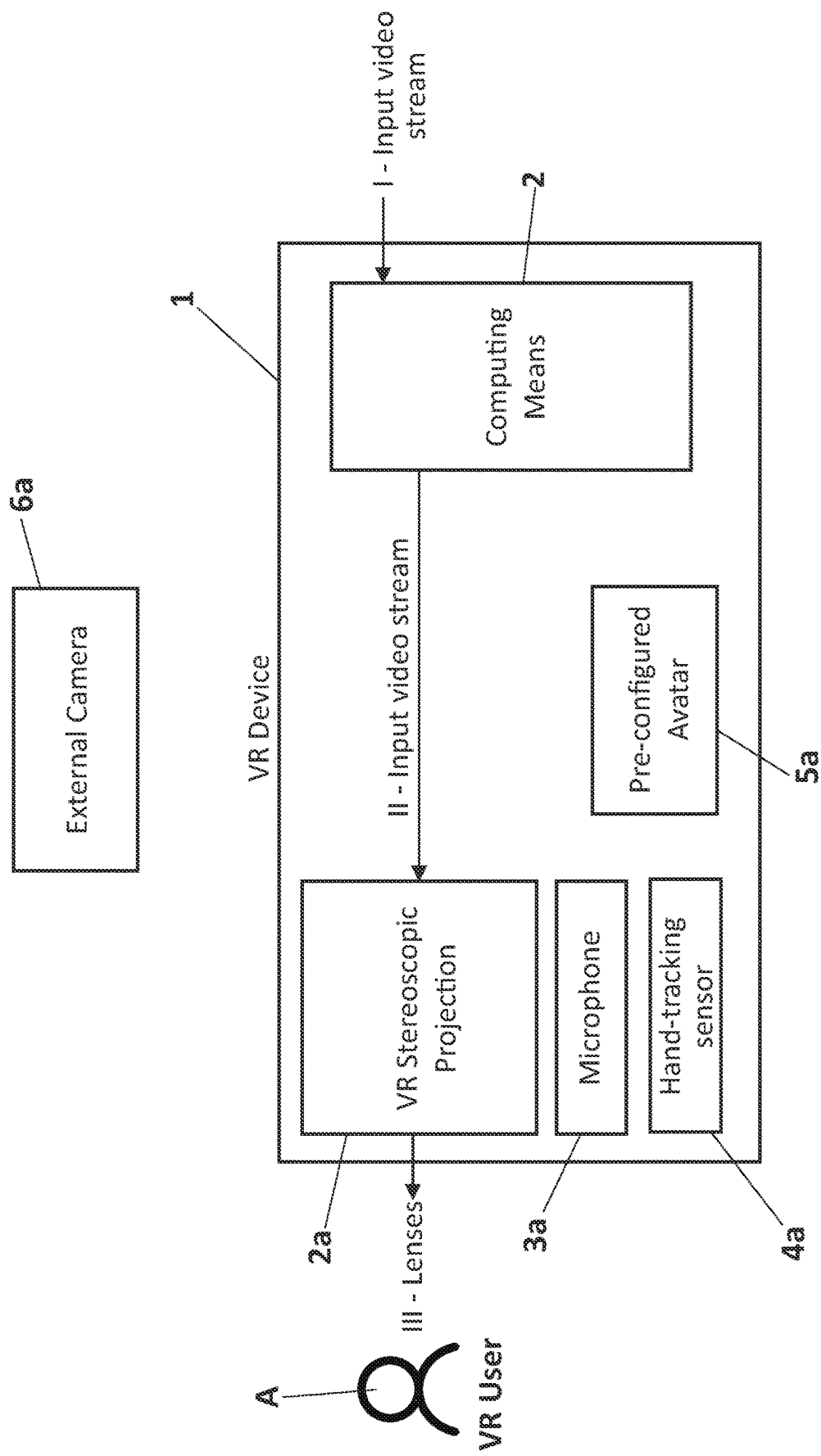
FIG. 8 shows the managing of an input video streaming from a caller with respect to a VR stereoscopic projection.

FIG. 8 describes the flow that the Solution 1 and Solution 2 follow:

Step (I): The input stream is received in the user's VR Device (1) by the computing means (2).

Step (II): The computing means (2), based in some configuration or user selection, selects whether the stream should co-exist with (being part of) the VR experience (2*a*) (i.e., solution 2) or replace it (i.e., solution 1). Furthermore, the computing means (2) updates the VR stereoscopic projection (2*a*) based on that.

Step (III): The VR user (A) watches the input stream, according to the configuration/selection through VR Device lenses comprise in the VR device (1).

As incoming calls can be potentially answered in both the mobile device (3) and the VR device (1), it would be possible to have some rules to determine whether both devices should ring simultaneously or one after the other. These rules could be:

Configured manually by end-user: depending on the time/hour, on the location of the mobile device, on the activity ongoing in the VR device, the calling number, etc.

Defined automatically using heuristics: the system determines based on how previous calls have been answered the optimal way for the user.

The description and drawings merely illustrate the principles of the invention. Although the present invention has been described with reference to specific embodiments, it should be understood by those skilled in the art that the foregoing and various other changes, omissions and additions in the form and detail thereof may be made therein without departing from the scope of the invention as defined by the following claims. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The invention claimed is:

1. A system (100) for managing incoming calls in a user's mobile device (3) while using a user's virtual reality (VR), device (1), comprising:
   the user's mobile device (3) comprising a SIM card associated to a Mobile Subscriber Integrated Services Digital Number (MSISDN), the SIM card associated to a mobile carrier provided with an IP Multimedia Subsystem, IMS, network (6);
   the user's VR, device (1) comprising computer (2) to perform a pairing process between the mobile device (3) and the user's VR device (1) and managing incoming calls;
   an authenticator (4) to authenticate the user's mobile device (3), wherein authenticate means that a VR user (A) is in possession of the user's mobile device (3) comprising the SIM card; and
   a Web Real Time Communications Gateway, WebRTC GW, (5) connected to the IMS network (6) of the mobile carrier and to translate IMS signaling into WebRTC signaling,
   wherein, in a first stage, the system is to perform pairing between the user's mobile device (3) and the user's VR device (1) by:
   the computer (2) in the user's VR device (1) being to:
   request the VR user (A) to enter the MSISDN associated to the SIM card of the user's mobile device (3);
   request the authenticator (4) to authenticate the VR user (A) by challenging the VR user (A) to probe the possession of the SIM card associated to the MSISDN;
      upon successful authentication of the user, the computer (2) being to:
   retrieve user's authentication credentials from the authenticator module (4); and
   register the user's authentication credentials in the WebRTC GW (5);
   upon registering the user's authentication credentials in the WebRTC GW, the WebRTC GW (5) being to:
   verify said credentials in the authenticator (4); and
   register the user's VR device (1) with the IMS network (6) to complete pairing,
      wherein, in a second stage, upon completing pairing between the user's mobile device (3) and the user's VR device (1), the system is to manage the flow of an incoming call from a caller (B) received at the MSISDN of the user's mobile device (3) by performing the following steps:
      the WebRTC GW (5) is to:
   receive an incoming call request associated with the incoming call incoming call from the caller (B); and
   notify the user's VR device (1) via the computer (2),
   the user's VR device (1) is to:
   inform the VR user (A) about the incoming call; and
   accept or rejecting the incoming call based on a user's action by establishing or rejecting a connection between the user's VR device (1) and the caller (B) via the WebRTC GW (5), and the WebRTC GW (5) is to:
   upon establishing the connection, notify the VR user (A) or the caller (B) that the connection is finished upon rejecting the connection by any of the parties.

2. Then system (100) according to claim 1, wherein the incoming call is an audio call or a video call.

3. The system (100) according to claim 1, wherein the incoming call is a video call with an incoming video stream and the user's VR device (1) is to provide a VR stereoscopic projection (2a) to the user, the computer (2) in the user's VR device (1) is to:
   prompt the VR user (A) to select a first output video stream to be transmitted to the caller (B) via the WebRTC GW (5), wherein the first output video stream is part of the VR stereoscopic projection (2a).

4. The system (100) according to claim 1, further comprising a recording device, wherein the incoming call is a video call with an incoming video stream and the user's VR device (1) is to provide a VR stereoscopic projection (2a) to the user, the computer (2) in the user's VR device (1) is to:
   prompt the VR user (A) to select a second output video stream to be transmitted to the caller (B) via the WebRTC GW (5), wherein the second output video stream is provided from a recording device.

5. The system (100) according to claim 4, wherein the recording device is an external camera (6a) to record the user.

6. The system (100) according to claim 1, wherein the user's VR device (1) further comprises a hand-tracking sensor (4a) to track the gestures performed by the VR user (A) with his hands.

7. The system (100) according to claim 1, wherein the user's VR device (1) further comprises a user's microphone (3a) to register the speech of the user.

8. The system (100) according to claim 7, wherein the incoming call is a video call with an incoming video stream and the user's VR device (1) is to provide a VR stereoscopic projection (2a) to the user, the computer (2) in the user's VR device (1) is to:
   generate a user's avatar based on:
   gestures performed by the VR user (A) with his hands obtained from the hand-tracking sensor (4a);
   video obtained from the external camera (6a); and/or
   audio obtained from the user's microphone (3a); and
   prompt the VR user (A) to transmit the user's avatar as third output video stream to the caller (B) via the WebRTC GW (5).

9. The system (100) according to claim 3, wherein the computer (2) in the user's VR device (1) is to:
   project the incoming video stream in replacement of the VR stereoscopic projection (2a); or
   project the incoming video stream in combination with the VR stereoscopic projection (2a).

10. The system (100) according to claim 9, wherein the user's avatar is static or dynamic.

11. The system (100) according to claim 1, wherein challenging the VR user (A) to probe the possession of the SIM card to authenticate the user's mobile device (3) comprises the reception of a PIN number received via SMS at the MSISDN associated with the SIM card in the user's mobile device (3).

12. A method for managing incoming calls in a user's mobile device (3) while using a user's virtual reality (VR) device (1), the method performed by a system (100) comprising:
   the user's mobile device (3) comprising a SIM card associated to a Mobile Subscriber Integrated Services Digital Number (MSISDN), the SIM card associated to a mobile carrier provided with an IP Multimedia Subsystem, IMS, network (6), the user's VR, device (1) comprising computing means (2) to perform a pairing process between the mobile device (3) and the user's VR device (1) and managing incoming calls, an authentication module (4) configured to authenticate the user's mobile device (3), wherein authenticate means that the VR user (A) is in possession of the user's mobile device (3) comprising the SIM card and a Web Real Time Communications Gateway, WebRTC GW (5) connected to the IMS network (6) of the mobile carrier and configured to translate IMS signaling into WebRTC signaling, wherein, in a first stage, the method comprises:

performing pairing between the user's mobile device (3) and the user's VR device (1) by carrying out the following steps:

requesting the VR user (A) to enter the MSISDN associated to the SIM card of the user's mobile device (3) by the computing means (2) in the user's VR device (1);

verifying the MSISDN by challenging the VR user (A) to probe the possession of the SIM card to authenticate the user's mobile device (3) by the computing means (2) in the user's VR device (1);

upon successful authentication of the user:

retrieving user's authentication credentials by the computing means (2) in the user's VR device (1); and registering the user's authentication credentials by the computing means (2) in the WebRTC GW (5);

upon registering the user's authentication credentials, verifying said credentials by the WebRTC GW (5) in the authentication module (4); and registering the user's VR device (1) with the IMS network (6) by the WebRTC GW (5) to complete pairing, wherein, in a second stage, upon completing pairing between the user's mobile device (3) and the user's VR device (1), the method comprises managing the flow of an incoming call from a caller (B) received at the MSISDN of the user's mobile device (3) by performing the following steps:

receiving an incoming call request associated with the incoming call from the caller (B) via the WebRTC GW (5):

notifying with the WebRTC GW (5) the user's VR device (1):

informing the VR user (A) about the incoming call with the user's VR device (1):

accepting or rejecting with the user's VR device (1) the incoming call based on a user's action by establishing or rejecting a connection between the user's VR device (1) and the caller (B);

upon establishing the connection notifying a VR user (A) or the caller (B) by the WebRTC GW (5) that the connection is finished upon rejecting the connection by any of the parties.

13. The method according to claim 12, further comprising:

receiving the incoming call firstly in the mobile device (3) based on the user's selection or based on heuristics generated by the computing means (2); or receiving the incoming call firstly in the VR device (1) based on the user's selection or based on heuristics generated by the computing means (2).

14. The method according to claim 12, wherein the incoming call is a video call with an incoming video stream and the user's VR device (1) is configured to provide a VR stereoscopic projection (2a) to the user, the method further comprises:

prompting the VR user (A) to select a first output video stream to be transmitted to the caller (B) via the WebRTC GW (5) by the computing means (2) in the user's VR device (1), wherein the first output video stream is part of the VR stereoscopic projection (2a); or prompting the VR user (A) to select a second output video stream to be transmitted to the caller (B) via the WebRTC GW (5) by the computing means (2) in the user's VR device (1), wherein the second output video stream is provided from a recording device; or generating by the computing means (2) in the user's VR device (1) a user's avatar based on:

gestures performed by the VR user (A) with his hands obtained from a hand-tracking sensor (4a);

video obtained from the recording device; and/or audio obtained from a user's microphone (3a); and prompting the VR user (A) to transmit the user's avatar as third output video stream to the caller (B) via the WebRTC GW (5) by the computing means (2) in the user's VR device (1).

15. The method according to claim 14, further comprising:

projecting the incoming video stream in replacement of the VR stereoscopic projection (2a) by the computing means (2) in the user's VR device (1); or projecting the incoming video stream in combination with the VR stereoscopic projection (2a) by the computing means (2) in the user's VR device (1).

\* \* \* \* \*